US012585565B2

(12) United States Patent
Wang et al.

(10) Patent No.: US 12,585,565 B2
(45) Date of Patent: Mar. 24, 2026

(54) SELECTING A RUNTIME CONFIGURATION BASED ON MODEL PERFORMANCE

(71) Applicant: Lenovo (Singapore) Pte. Ltd., New Tech Park (SG)

(72) Inventors: Mengnan Wang, Chapel Hill, NC (US); John W. Nicholson, Cary, NC (US); Barrett Bryson, Raleigh, NC (US); Nikhil Ambha Madhusudhana, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 411 days.

(21) Appl. No.: 18/192,405

(22) Filed: Mar. 29, 2023

(65) Prior Publication Data

US 2024/0330141 A1     Oct. 3, 2024

(51) Int. Cl.
*G06F 11/34* (2006.01)
*G06F 9/445* (2018.01)
*G06F 11/30* (2006.01)

(52) U.S. Cl.
CPC ...... *G06F 11/3447* (2013.01); *G06F 9/44505* (2013.01); *G06F 11/3024* (2013.01)

(58) Field of Classification Search
CPC .............. G06F 11/302; G06F 11/3024; G06F 11/3409; G06F 11/3447; G06F 9/44505
USPC ......................................... 702/182
See application file for complete search history.

(56) References Cited

U.S. PATENT DOCUMENTS

| | | | |
|---|---|---|---|
| 11,614,963 B2 * | 3/2023 | Jia ....................... | G06F 9/44505 718/105 |
| 2018/0246762 A1 * | 8/2018 | Tarsa .................... | G06F 9/5083 |
| 2020/0302343 A1 * | 9/2020 | Gupta ................... | G06F 18/214 |

* cited by examiner

*Primary Examiner* — John H Le

(74) *Attorney, Agent, or Firm* — Kunzler Needham & Hilton

(57) ABSTRACT

A method, apparatus, and computer program product for selecting a runtime configuration based on model performance. The method includes running a computing model on a computing device using a first runtime configuration among a plurality of runtime configurations that are configured for the computing model and determining, by the computing device, a reduction in model performance. The method includes identifying, among the plurality of runtime configurations, a second runtime configuration based at least in part on the determined reduction in model performance and running the computing model using the second runtime configuration in response to the determined reduction in model performance.

20 Claims, 7 Drawing Sheets

100

Peer Device
122b

Peer Device
122c

Peer Device
122a

Peer Device
122d

Network
114

Storage
Controller
116

Data
Storage
Device
118

Model
Database
120

Computing Device 101

Processor(s)
102

Network
Adapter
106

Computing
Model
110

Memory
Device
104

I/O Controller
108

Runtime
Apparatus
112

200

300

600

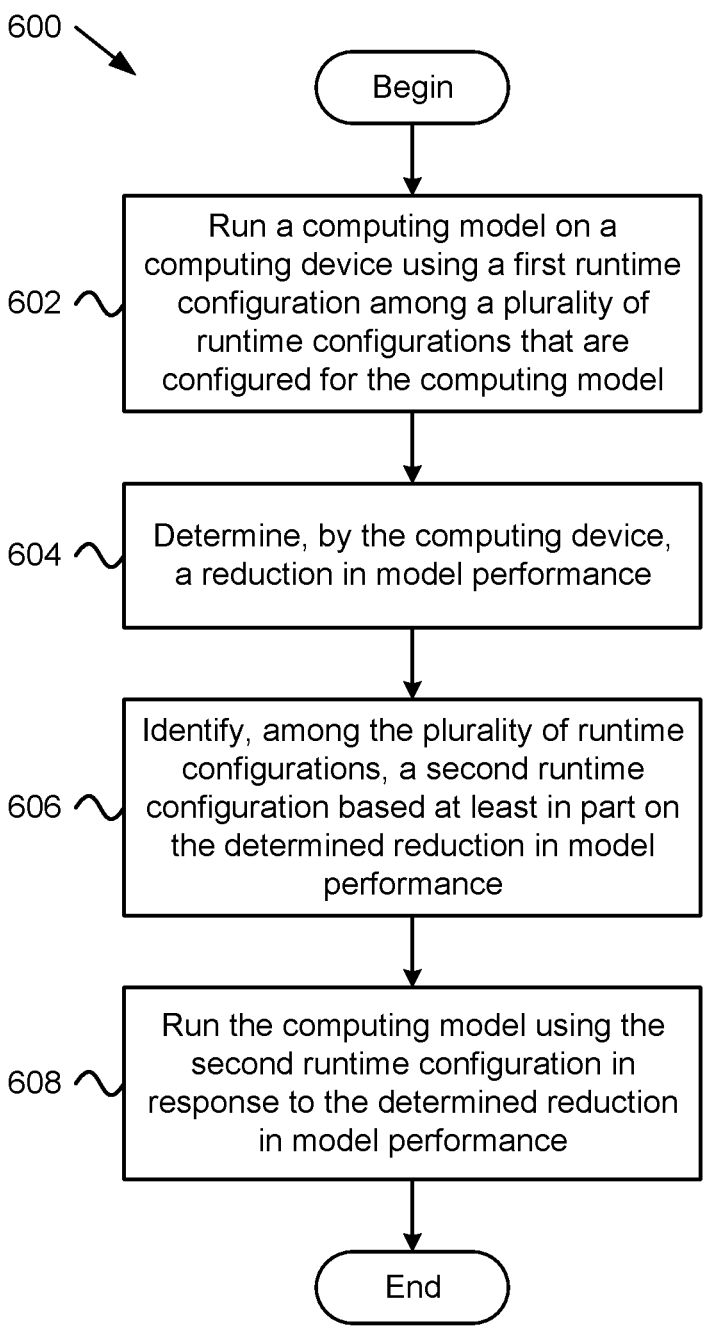

Begin

602 — Run a computing model on a computing device using a first runtime configuration among a plurality of runtime configurations that are configured for the computing model 604 — Determine, by the computing device, a reduction in model performance 606 — Identify, among the plurality of runtime configurations, a second runtime configuration based at least in part on the determined reduction in model performance 608 — Run the computing model using the second runtime configuration in response to the determined reduction in model performance End

FIG. 6

SELECTING A RUNTIME CONFIGURATION BASED ON MODEL PERFORMANCE

FIELD

The subject matter disclosed herein relates to configurations for a machine learning model and more particularly relates to selecting a runtime configuration based on model performance.

BACKGROUND

Machine learning models are computer programs that are used to recognize patterns in data or make predictions. However, running a machine learning model can be resource intensive. When running machine learning models, due to varying system resources, the model output may be unstable and/or have unexpected latency.

BRIEF SUMMARY

Disclosed are procedures for selecting a runtime configuration based on model performance. Said procedures may be implemented by apparatus, systems, methods, or computer program products.

According to one aspect, a method includes running a computing model on a computing device using a first runtime configuration among a plurality of runtime configurations that are configured for the computing model, and determining a reduction in model performance. In some embodiments, the operations include identifying, among the plurality of runtime configurations, a second runtime configuration based at least in part on the determined reduction in model performance and running the computing model using the second runtime configuration in response to the determined reduction in model performance.

According to another aspect, an apparatus includes a memory coupled to a processor, the memory comprising instructions executable by the processor to cause the apparatus to run a computing model using a first runtime configuration among a plurality of runtime configurations that are configured for the computing model, and determine a reduction in model performance. In some embodiments, the instructions are further executable by the processor to cause the apparatus to identify, among the plurality of runtime configurations, a second runtime configuration based at least in part on the determined reduction in model performance and run the computing model using the second runtime configuration in response to the determined reduction in model performance.

According to a third aspect, a computer program product includes a non-transitory computer readable storage medium storing code. The code is configured to be executable by a processor to perform operations. The operations include running a computing model using a first runtime configuration among a plurality of runtime configurations that are configured for the computing model, and determining a reduction in model performance. In some embodiments, the operations include identifying, among the plurality of runtime configurations, a second runtime configuration based at least in part on the determined reduction in model performance and running the computing model using the second runtime configuration in response to the determined reduction in model performance.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 6 is a flow chart diagram illustrating one embodiment of a representative method for selecting a runtime configuration based on model performance.

DETAILED DESCRIPTION

Figure 1:
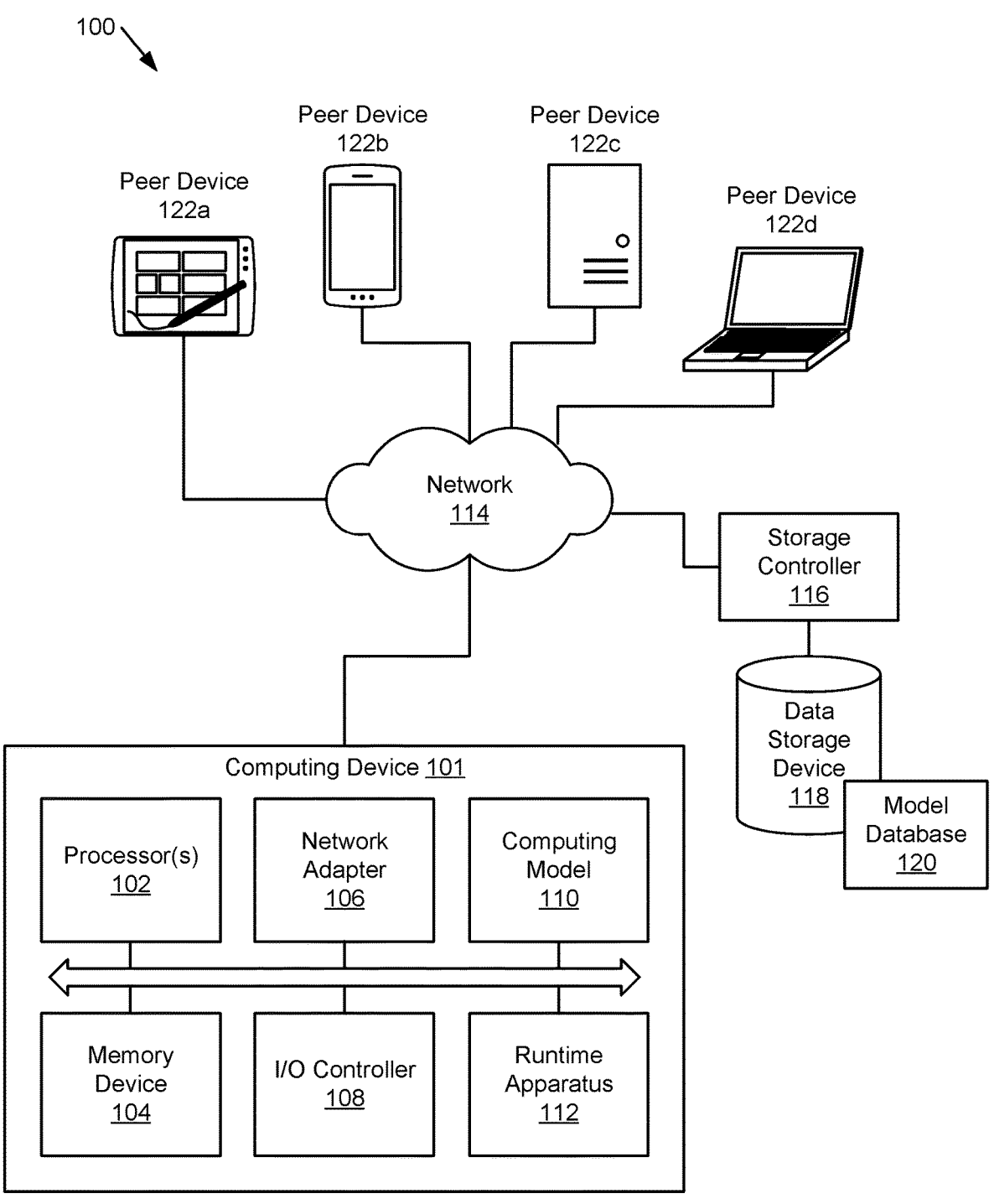
FIG. 1 is a block diagram illustrating one embodiment of a system for selecting a runtime configuration based on model performance.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable logic array ("PLA"), programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and N may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM"), an electrically erasable programmable read-only memory ("EEPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each N computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")). In some embodiments, electronic circuitry including, for example, programmable logic circuitry, FPGAs, or PLAs may execute the computer readable program instructions by utilizing state information of the computer readable program instructions to personalize the electronic circuitry, in order to perform aspects of the present invention.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid a obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to flowchart illustrations and/or block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code or computer readable program instructions.

The code (e.g., computer readable program instructions) may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The code (e.g., computer readable program instructions) may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The code (e.g., computer readable program instructions) may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for selecting a runtime configuration based on model performance. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

As discussed above, when running machine-learning ("ML") models, due to varying system resources—e.g., resource conflict with other applications running on a computing device, the output of a computing model may be unstable and have unexpected latency. For example, an artificial intelligence ("AI")-based image processing model may drop frames and/or experience unexpected frame processing latency when other applications are taking Graphic Processing Unit ("GPU") resources. As another example, for deep leaning multi-model models, the processing and generation latency vary based on server capacity and network conditions.

To mitigate the impact of varying computing resources on the output of the computing model, the proposed solutions automatically adjust a runtime configuration of the machine learning model based on the availability of the computing resources (also referred to as "system resources"). Examples of computing resources include, but are not limited to, Central Processing Unit ("CPU") time (e.g., time on one or more processor cores), GPU time, Neural Processing Unit ("NPU") time, RAM allocation, memory cache space (e.g., including CPU cache, memory management unit ("MMU") cache, display server resources, network throughput, input/output ("I/O") ports, I/O operation time, chipset frequency, power usage, and the like.

A method, apparatus, and computer program product for protecting smart home devices from obstructed voice commands is disclosed. According to one aspect of the disclosure, the method may include running a computing model on a computing device using a first runtime configuration among a plurality of runtime configurations that are configured for the computing model. In some embodiments, the method may include determining, by a computing device, a reduction in model performance and identifying, among the plurality of runtime configurations, a second runtime configuration based at least in part on the determined reduction in model performance. In some embodiments, the method may include running the computing model using the second runtime configuration in response to the determined reduction in model performance.

In some embodiments, the method may include monitoring a set of performance metrics associated with the computing device, wherein determining the reduction in model performance comprises determining the reduction in model performance based at least in part on the monitored set of performance metrics.

In certain embodiments, the monitored set of performance metrics includes one or more of: a processor usage, a chipset temperature, an inter-frame arrival time, a frame processing time, a frame processing rate, an available amount of computing resources, or a combination thereof.

In some embodiments, the method may include capturing audio input and predicting an increase in computing resource usage based at least in part on the captured audio input. In such embodiments, determining the reduction in model performance may include determining the reduction in model performance based at least in part on the predicted increase in computing resource usage.

In some embodiments, the method may include monitoring for a predetermined set of user interface ("UI") interactions and predicting an increase in computing resource usage based at least in part on detecting an interaction from the predetermined set of UI interactions. In such embodiments, determining the reduction in model performance may include determining the reduction in model performance based at least in part on the predicted increase in computing resource usage.

In some embodiments, running the computing model using the second runtime configuration comprises re-configuring the computing model in real-time.

In some embodiments, the computing model comprises one of: a ML model, an AI model, a Deep Learning model, or a combination thereof.

In certain embodiments, the computing model outputs image data, wherein the output image data has a first resolution when using the first runtime configuration and has a second resolution, lower than the first resolution, when using the second runtime configuration.

In some embodiments, the method may include receiving, via an application programming interface ("API"), a notification of scheduled consumption of computing resources. In such embodiments, determining the reduction in model performance may include determining the reduction in model performance based at least in part on the notification of scheduled consumption of computing resources.

In some embodiments, the second runtime configuration uses fewer computing resources than the first runtime configuration. Moreover, the method may further include determining an end to the reduction in model performance and running the computing model using the first runtime configuration in response to the end to the reduction in model performance.

According to another aspect of the invention, an apparatus may include a memory coupled to a processor, the memory comprising instructions executable by the processor to cause the apparatus to run a computing model using a first runtime configuration among a plurality of runtime configurations that are configured for the computing model. In some embodiments, the instructions are further executable by the processor to cause the apparatus to determine a reduction in model performance and identify, among the plurality of runtime configurations, a second runtime configuration based at least in part on the determined reduction in model performance. In some embodiments, the instructions are further executable by the processor to cause the apparatus to run the computing model using the second runtime configuration in response to the determined reduction in model performance.

In some embodiments, the instructions are further executable by the processor to cause the apparatus to monitor a set of performance metrics associated with the apparatus. In such embodiments, to determine the reduction in model performance, the instructions are further executable by the processor to cause the apparatus to determine the reduction in model performance based at least in part on the monitored set of performance metrics.

In certain embodiments, the monitored set of performance metrics includes one or more of: a processor usage, a chipset temperature, an inter-frame arrival time, a frame processing time, a frame processing rate, an available amount of computing resources, or a combination thereof.

In some embodiments, the instructions are further executable by the processor to cause the apparatus to capture audio input and predict an increase in computing resource usage based at least in part on the captured audio input. In such embodiments, to determine the reduction in model performance, the instructions are executable by the processor to cause the apparatus to determine the reduction in model performance based at least in part on the predicted increase in computing resource usage.

In some embodiments, the instructions are further executable by the processor to cause the apparatus to monitor for a predetermined set of UI interactions and predict an increase in computing resource usage based at least in part on detecting a UI interaction from the predetermined set of UI interactions. In such embodiments, to determine the reduction in model performance, the instructions are executable by the processor to cause the apparatus to determine the reduction in model performance based at least in part on the predicted increase in computing resource usage.

In some embodiments, to run the computing model using the second runtime configuration, the instructions are executable by the processor to cause the apparatus to re-configure the computing model in real-time.

In some embodiments, the computing model comprises one of: a ML model, an AI model, a Deep Learning model, or a combination thereof.

In certain embodiments, the computing model outputs image data, wherein the output image data has a first resolution when using the first runtime configuration and has a second resolution, lower than the first resolution, when using the second runtime configuration.

In some embodiments, the instructions are further executable by the processor to cause the apparatus to receive, via an API, a notification of scheduled consumption of computing resources. In such embodiments, to determine the reduction in model performance, the instructions are executable by the processor to cause the apparatus to determine the reduction in model performance based at least in part on the notification of scheduled consumption of computing resources.

In some embodiments, the second runtime configuration uses fewer computing resources than the first runtime configuration, wherein the instructions are further executable by the processor to cause the apparatus to determine an end to the reduction in model performance and run the computing model using the first runtime configuration in response to the end to the reduction in model performance.

According to a third aspect of the invention, a computer program product may include a non-transitory computer readable storage medium storing code, the code being configured to be executable by a processor to perform operations. In some embodiments, the operations include running a computing model using a first runtime configuration among a plurality of runtime configurations that are configured for the computing model. In some embodiments, the operations include determining a reduction in model performance and identifying, among the plurality of runtime configurations, a second runtime configuration based at least in part on the determined reduction in model performance. In some embodiments, the operations include running the computing model using the second runtime configuration in response to the determined reduction in model performance.

In some embodiments, the operations include monitoring a set of performance metrics associated with the computing device, wherein determining the reduction in model performance comprises determining the reduction in model performance based at least in part on the monitored set of performance metrics.

In certain embodiments, the monitored set of performance metrics includes one or more of: a processor usage, a chipset temperature, an inter-frame arrival time, a frame processing time, a frame processing rate, an available amount of computing resources, or a combination thereof.

In some embodiments, the operations include capturing audio input and predicting an increase in computing resource usage based at least in part on the captured audio input. In such embodiments, determining the reduction in model performance may include determining the reduction in model performance based at least in part on the predicted increase in computing resource usage.

In some embodiments, the operations include monitoring for a predetermined set of UI interactions and predicting an increase in computing resource usage based at least in part on detecting a UI interaction from the predetermined set of UI interactions. In such embodiments, determining the reduction in model performance may include determining the reduction in model performance based at least in part on the predicted increase in computing resource usage.

In some embodiments, running the computing model using the second runtime configuration comprises re-configuring the computing model in real-time.

In some embodiments, the computing model comprises one of: a ML model, an AI model, a Deep Learning model, or a combination thereof.

In certain embodiments, the computing model outputs image data, wherein the output image data has a first resolution when using the first runtime configuration and has a second resolution, lower than the first resolution, when using the second runtime configuration.

In some embodiments, the operations include receiving, via an API, a notification of scheduled consumption of computing resources. In such embodiments, determining the reduction in model performance may include determining the reduction in model performance based at least in part on the notification of scheduled consumption of computing resources.

In some embodiments, the second runtime configuration uses fewer computing resources than the first runtime configuration. Moreover, the operations further include determining an end to the reduction in model performance and running the computing model using the first runtime configuration in response to the end to the reduction in model performance.

FIG. 1 depicts an exemplary system 100 for #theme, according to embodiments of the disclosure. The system 100 includes is presented to show one example of an environment where an apparatus and method may be implemented in accordance with the embodiments of the disclosure. As depicted, the system 100 may include a computing device 101 comprising at least one processor 102, at least one memory device 104, at least one network adapter 106, at least one I/O controller, and an adaptive runtime apparatus 112. The computing device 101 is configured to run a computing model 110, e.g., which may be stored in a memory device 104 and executed using a processor 102.

The processor(s) 102 may be operably connected to the memory device(s) 104. The memory device(s) 104 may include one or more non-volatile storage devices such as hard drives, solid state drives, CD-ROM drives, DVD-ROM drives, tape drives, or the like. The memory device(s) 104 may also include non-volatile memory such as a read-only memory (e.g., ROM, EPROM, EEPROM, and/or Flash ROM) or volatile memory such as a random access memory (e.g., RAM or operational memory). A computer bus, or plurality of buses, may interconnect the processor(s) 102, memory device(s) 104, the network adapter(s) 106, the I/O controller(s) 108, the adaptive runtime apparatus 112, and other devices to enable data and/or instructions to pass therebetween.

To enable communication with external systems or devices, the computing device 101 may include one or more I/O controllers 108. Such I/O controller(s) 108 may be embodied as wired ports (e.g., USB ports, serial ports, Firewire ports, SCSI ports, parallel ports, etc.) or wireless Sports (e.g., Bluetooth, IrDA, etc.). The I/O controller(s) 108 may enable communication with one or more input devices (e.g., keyboards, mice, touchscreens, cameras, microphones, scanners, storage devices, etc.) and output devices (e.g., displays, monitors, speakers, printers, storage devices, etc.). The I/O controller(s) 108 may also enable communication with other computing device 101.

In certain embodiments, the computing device 101 includes a wired or wireless network adapter 106 to connect the computing device 101 to a network 114, such as a LAN, WAN, or the Internet. Such a network 114 may enable the computing device 101 to connect to one or more servers, workstation, mobile computing devices, or other devices. The network 114 may also enable the computing device 101 to connect to a storage controller 116 communicatively coupled to a data storage device 118 which stores at least one model database 120, which are described below.

Via the network 114, the computing device 101 may be interact with one or more communication peer devices, such as a table computer 122a, a mobile phone 122b, a workstation or personal computer 122c, and/or laptop 122d (referred to collectively as "peer devices" 122). While not depicted in FIG. 1, the system 100 may include—or be coupled to—various telecommunications equipment, such as email servers, communications servers, routers, switches, gateways, and other network elements and networking devices.

The system 100 is representative of various systems where the embodiments described herein may be deployed. The computing device 101, in some embodiments, is in a data center and may be a cloud implementation. For example, the computing device 101 may be leased and the adaptive runtime apparatus 112 may be implemented in one or more virtual machines, containers, or the like. In other embodiments, the computing device 101 is user-owned and the adaptive runtime apparatus 112 is implemented thereon. While a single computing device 101 is depicted, one of skill in the art will recognize that the adaptive runtime apparatus 112 may be deployed on multiple computing devices 101 for ease of deployment, for redundancy, etc.

In some embodiments, the computing device 101 may be a rack-mounted server, a workstation, a mainframe computer, a desktop server, a laptop server, and the like or any combination thereof: In such embodiments, the computing device 101 includes one or more processors, memory, data buses, access to non-volatile data storage, input/output connections, and the like. One of skill in the art will recognize other implementations of a computing device 101 capable of executing the adaptive runtime apparatus 112.

The peer devices 122 are depicted as a tablet computer, a smartphone, a desktop computer, and a laptop computer as examples but may be implemented by a workstation, a terminal, or other computing device capable of connection to the computing device 101 over the computer network 114. In some embodiments, a peer device 122 is used by a system administrator for installation, maintenance, control, etc., of the adaptive runtime apparatus 112. In other embodiments, the peer devices 122 are user devices for using the adaptive runtime apparatus 112. For example, a user may use a smartphone as a peer device 12210 to interact with the adaptive runtime apparatus 112.

The computer network 114 connects the peer devices 122 to the computing device 101 to access the adaptive runtime apparatus 112 and may also be used to access the data storage device 118. The computer network 114 includes one or more networks. For example, the computer network 114 may include a LAN and may include a gateway to the Internet. The computer network 114 network may include cabling, optical fiber, etc. and may also include a wireless connection and may include a combination of network types. The computer network 114 may include a LAN, a WAN, a storage area network ("SAN"), an optical fiber network, etc. Various computer networks that are part of the depicted computer network 114 may be private and/or public, for example, through an Internet Service Provider.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM" ®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA®"). Alternatively, the wireless connection may be a cellular telephone network communication. All standards and/or connection types include the latest version and revision of the standard and/or connection type as of the filing date of this application.

The system 100 is depicted with a storage controller 116 with a data storage device 118. In some embodiments, the storage controller 116 and the data storage device 118 are part of a SAN that is accessible to the computing device 101 and/or to the client devices 110. Access to the data storage device 118 by the computing device 101 and/or a peer device 122 may be indirect for typical users while a system administrator may have direct access to the data storage device 118 through the SAN or through the computing device 101. The data storage device 118 is depicted as a single data storage device but may include multiple devices. For example, the data storage device 118 may be accessed as one or more virtual storage devices and the data storage device 118 may be implemented with multiple data storage devices (e.g., computer readable storage media) deployed using a redundant array of independent devices ("RAID") or the like. In other embodiments, the computing device 101 may include internal non-volatile data storage in addition to or in place of the data storage device 118 and storage controller 116. One of skill in the art will recognize other ways to implement non-volatile data storage, a computing device 101, etc., to implement the adaptive runtime apparatus 112.

In various embodiments, the adaptive runtime apparatus 112 includes a way to receive a computing model 110 from the model database 120. The computing model 110 may include, but is not limited to, an MIL model, AI model, a Deep Learning model, a computational model, a simulator model, a neural network model, cognitive model, etc. In certain embodiments, the computing model 110 may be pre-configured with multiple runtime configurations. In another embodiment, the adaptive runtime apparatus 112 may generate the multiple runtime configurations, e.g., by compile the computing model 110.

The adaptive runtime apparatus 112 includes a way to detect, infer, or predict a performance reduction associated with the execution of the computing model 110. In one embodiment, the adaptive runtime apparatus 112 monitors performance metrics to detect a reduction in the performance of the computing model 110. In another embodiment, the adaptive runtime apparatus 112 monitors user activity to predict the reduction in the performance of the computing model 110.

When the performance reduction associated with the execution of a first configuration of the computing model 110 is detected, predicted, or inferred, the adaptive runtime apparatus 112 also selects a second configuration of the computing model 110 and adjusts the runtime execution of the computing model 110 to use the selected second configuration.

In some embodiments, when the adaptive runtime apparatus 112 determines that one of the monitored performance metrics exceeds its predefined range (e.g., processed frame rate drops below a certain number due to scene change or device background activity, or the frame processing time exceeds a certain percentage threshold of the inter-frame arrival time), then the adaptive runtime apparatus 112 may change the computing model 110 runtime configuration such that the new runtime configuration delivers a relatively lower performance, but uses less computing resource and/or uses less processing time.

For example, in an AI-based image processing context, the updated configuration may run the computing model 110 in a lower native resolution when reduced performance is detected. In other cases, the adaptive runtime apparatus 112 switching to a different lightweight configuration of the computing model 110. As another example, for deep leaning multi-model models, the processing and generation latency vary based on server capacity and network conditions.

For certain multi-model computing models 110, the output result when running the first configuration may be generated with results going through all the multi-model steps; however, the output result when running the second configuration may be generated in the same pipeline while skipping certain model(s). In various embodiments, the re-configuration of the computing model 110 is performed in real-time so that the re-configuration would not interrupt the continuity and consistency of results.

In addition to the proposed system metrics, which would only allow the overall solution to recover from resource contention issues after they arrive, in some embodiments the adaptive runtime apparatus 112 implements a proactive solution which correlates activities with future resource contention. In certain embodiments, the adaptive runtime apparatus 112 uses a machine-learning model to associate different cues and situations with reduced computing performance in order to predict when the performance reduction associated with the execution of a first configuration of the computing model 110 will occur.

For example, the adaptive runtime apparatus 112 may learn that when starting to share the screen from an application (e.g., sharing to a peer device 122), additional resources are required to encode the shared desktop or application window. In one embodiment, the application may be a Unified Communication ("UC") application with tools for voice calls, video calls, chat, etc. In another embodiment the application may be a standalone application. In a related way, decoding another user's (e.g., corresponding to a peer device 122) shared desktop requires additional resources which may reduce the computing resources available for the computing model 110. Accordingly, the adaptive runtime apparatus 112 may monitor for UI interactions that enable screen sharing and proactively decrease ML model resource consumption ahead of the desktop encoding request.

As another example, the adaptive runtime apparatus 112 may use a natural-language understanding ("NLU") or natural-language interpretation ("NLI") to process verbal cues from a microphone, such as "let me share my screen," to predict that additional resources are about to be consumed.

In some embodiments, components of the system 100 may programmatically notify the adaptive runtime apparatus 112 of impending resource consumption that would negatively impact execution of computing models 110 (e.g., AI model, ML model, etc.). In the above example, instead of building correlations or otherwise automatically proactively reducing resource consumption, an application, operating system, application server, etc. may notify the adaptive runtime apparatus 112—via an API—what resources are about to be consumed. The adaptive runtime apparatus 112 is described in more detail below in relation to FIGS. 2 and 3.

Figure 2:
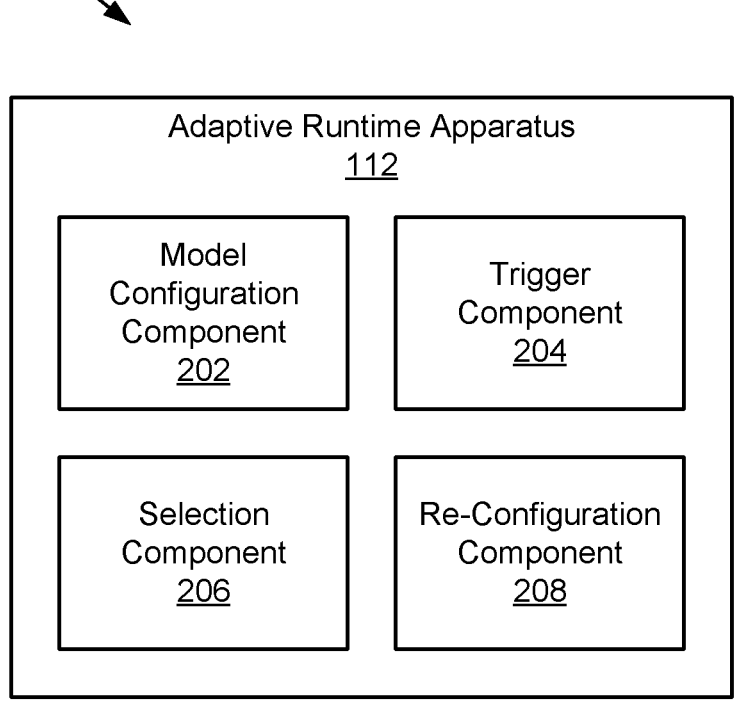
FIG. 2 is a block diagram illustrating one embodiment of an adaptive runtime apparatus, according to various embodiments.

FIG. 2 depicts an exemplary apparatus 200 for #theme, according to embodiments of the disclosure. The apparatus 200 includes one embodiment of the adaptive runtime apparatus 112 that includes a model configuration component 202, a trigger component 204, a selection component 206, and a re-configuration component 208, which are described below.

Note that the components 202-208 may include any component or set of components that perform the functionality attributed to the component. This may include one or more physical processors which execute processor-readable instructions, the processor-readable instructions (e.g., as software application or other executable), circuitry, computer hardware, storage media, some combination of software, hardware, and/or firmware, or any other components. The description of the functionality provided by the different components 202, 204, 206, and/or 208 described below is for illustrative purposes, and is not intended to be limiting, as any of components 202, 204, 206, and/or 208 may provide more or less functionality than is described. For example, one or more of components 202, 204, 206, and/or 208 may be eliminated, and some or all of its functionality may be provided by other ones of components 202, 204, 206, and/or 208. As another example, the apparatus 200 may comprise additional components that may perform some or all of the functionality attributed below to one or more of the components 202, 204, 206, and/or 208.

The apparatus 200 includes a model configuration component 202 configured to run the computing model 110 using a first runtime configuration among a plurality of runtime configurations that are configured for the computing model. In some embodiments, the model configuration component 202 may select the first runtime configuration based on available computing resources. For example, the first runtime configuration may be selected to maximize performance of the computing model 110. As described above, the computing model 110 may be a ML model, AI model, etc. that provides a real-time output.

The apparatus 200 includes a trigger component 204 configured to determine a reduction in performance of the computing model 110. In some embodiments, the trigger component 204 may detect a reactive trigger indicative of the reduction in performance of the computing model 110. In some embodiments, the trigger component 204 may detect a predictive trigger indicative of the reduction in performance of the computing model 110. The trigger component 204 is described in more detail below in relation to FIG. 3.

The apparatus 200 includes a selection component 206 configured to identify, among the plurality of runtime configurations, a second runtime configuration of the computing model 110 based at least in part on the determined reduction in the performance of the computing model 110. In some embodiments, the model configuration component 202 may select the first runtime configuration based on a reduced availability of the computing resources. For example, the first runtime configuration may be selected to minimize user disruption, e.g., maximize the output consistency and/or the continuity for the computing model 110.

The apparatus 200 includes a re-configuration component 208 configured to run the computing model 110 using the second runtime configuration in response to the determined reduction in the performance of the computing model 110. In some embodiments, the re-configuration component 208 re-configures the computing model 110 in real-time, responsive to the determined reduction in performance.

In some embodiments, the computing model 110 is an image processing model that outputs image data. In such embodiments, the output image data may have a first (e.g., higher) resolution when using the first runtime configuration and may have a second (e.g., lower) resolution when using the second runtime configuration.

In some embodiments, the computing model 110 uses fewer computing resources when in the second runtime configuration than it uses when in the first runtime configuration. Moreover, in certain embodiments, the re-configuration component 208 may further adjust the runtime configuration of the computing model 110 in response to a further reduction in model performance or a further decrease in available computing resources (e.g., as determined by the trigger component 204). For example, the selection component 206 may select a third runtime configuration of the computing model 110 (e.g., in response to the further reduction in model performance) and the re-configuration component 208 may re-configure the computing model 110 to run using the third runtime configuration.

In some embodiments, the re-configuration component 208 may revert the runtime configuration of the computing model 110 in response to an increase in available computing resources. For example, the trigger component 204 may determine an end to the reduction in model performance (e.g., due to an increase in available computing resources) and trigger the re-configuration component 208 to adjust the runtime configuration of the computing model 110 to use the first runtime configuration.

Figure 3:
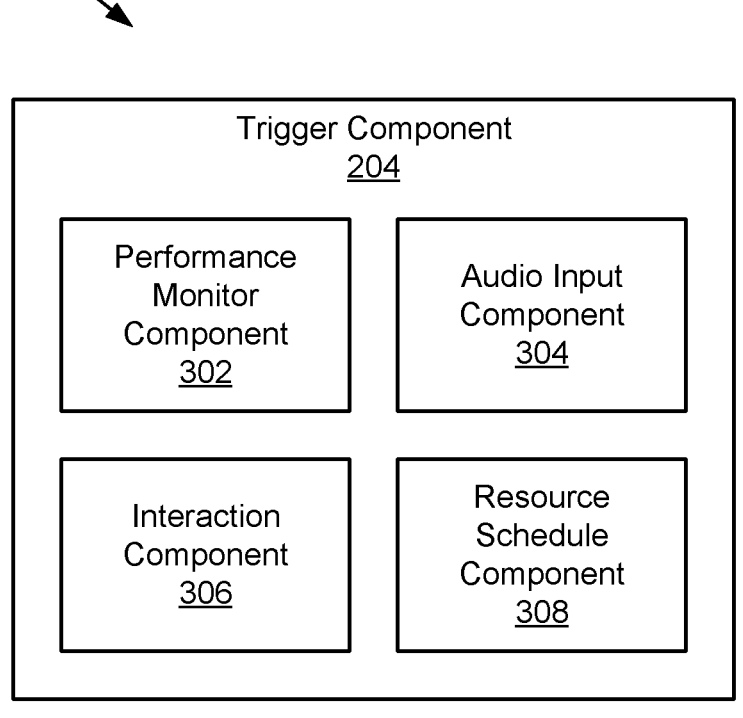
FIG. 3 is a block diagram illustrating one embodiment of a triggering component for selecting a runtime configuration based on model performance, according to various embodiments.

FIG. 3 depicts an embodiment of an apparatus 300 for #theme, according to embodiments of the disclosure. The apparatus 300 includes one embodiment of the trigger component 204 that includes a performance monitor component 302, an audio input component 304, an interaction component 306, and a resource schedule component 308, which are described below.

Note that the components 302-308 may include any component or set of components that perform the functionality attributed to the component. This may include one or more physical processors which execute processor-readable instructions, the processor-readable instructions (e.g., as software application or other executable), circuitry, computer hardware, storage media, some combination of software, hardware, and/or firmware, or any other components. The description of the functionality provided by the different components 302, 304, 306, and/or 308 described below is for illustrative purposes, and is not intended to be limiting, as any of components 302, 304, 306, and/or 308 may provide more or less functionality than is a described. For example, one or more of components 302, 304, 306, and/or 308 may be eliminated, and some or all of its functionality may be provided by other ones of components 302, 304, 306, and/or 308. As another example, the apparatus 300 may comprise additional components that may perform some or all of the functionality attributed below to one or more of the components 302, 304, 306, and/or 308.

The apparatus 300 includes a performance monitor component 302 configured to monitor a set of performance metrics associated with the apparatus 300. In some embodiments, the monitored performance metrics include one or more of: of: CPU usage, GPU usage, NPU usage, a processor usage, a processor frequency, a chipset frequency, a processor temperature, a chipset temperature, a socket temperature, a component temperature, an inter-frame arrival time, a frame processing time, a frame processing rate, an available amount of computing resources, a response time, a service time, a wait time, a transmission time, a completion time, a latency, a channel capacity, a bandwidth, a throughput, a battery level (or state-of-charge), a power management mode, a power usage, or a combination thereof.

The apparatus 300 includes an audio input component 304 configured to capture audio input and predict an increase in computing resource usage based at least in part on the captured audio input. In various embodiments, the audio input component 304 may include or be operatively coupled to one or more microphones (or other sensors) capable of capturing audio input from a user, such as speech and/or voice commands. In some embodiments, the audio input component 304 monitors the audio input to detect an audio cue indicative of a resource conflict or resource consumption correlated with a drop in performance of the computing model 110. Moreover, the trigger component 204 may determine the reduction in model performance based at least in part on using a predicted increase in computing resource usage inferred by the audio input component 304.

For example, screen sharing may be an activity correlated with a drop in performance of the computing model 110. Here, the audio input component 304 may monitor for a verbal cue such as "let me share my screen" or similar vocalized statement that indicates that additional computing resources are about to be consumed. In certain embodiments, the audio input component 304 may use a NLU and/or NLI to process the audio input to predict that additional resources are about to be consumed.

The apparatus 300 includes an interaction component 306 configured to monitor for a predetermined set of UI interactions and predict an increase in computing resource usage based at least in part on detecting a UI interaction from the predetermined set of UI interactions. Here, the predetermined set of UI application are correlated with a drop in performance of the computing model 110. In various embodiments, the interaction component 306 may interact with an application or operating system to detect the UI interaction correlated with a drop in performance of the computing model 110.

For example, the interaction component 306 may monitor for UI interactions that enable screen sharing and proactively infer a reduction in model performance due to a predicted increase in computing resource usage. Moreover, the trigger component 204 may determine the reduction in model performance based at least in part on using a predicted increase in computing resource usage inferred by the interaction component 306.

The apparatus 300 includes a resource schedule component 308 configured to receive, via an application programming interface, a notification of scheduled consumption of computing resources. Here, the resource schedule component 308 may monitor for system calls correlated with a drop in performance of the computing model 110. In certain embodiments, the resource schedule component 308 may provide an exposed API and receive notifications from an application or operating system of impending resource consumption affecting the performance of the computing model 110. Moreover, the trigger component 204 may determine the reduction in model performance based at least in part on impending resource consumption determined by the resource schedule component 308.

Figure 4:
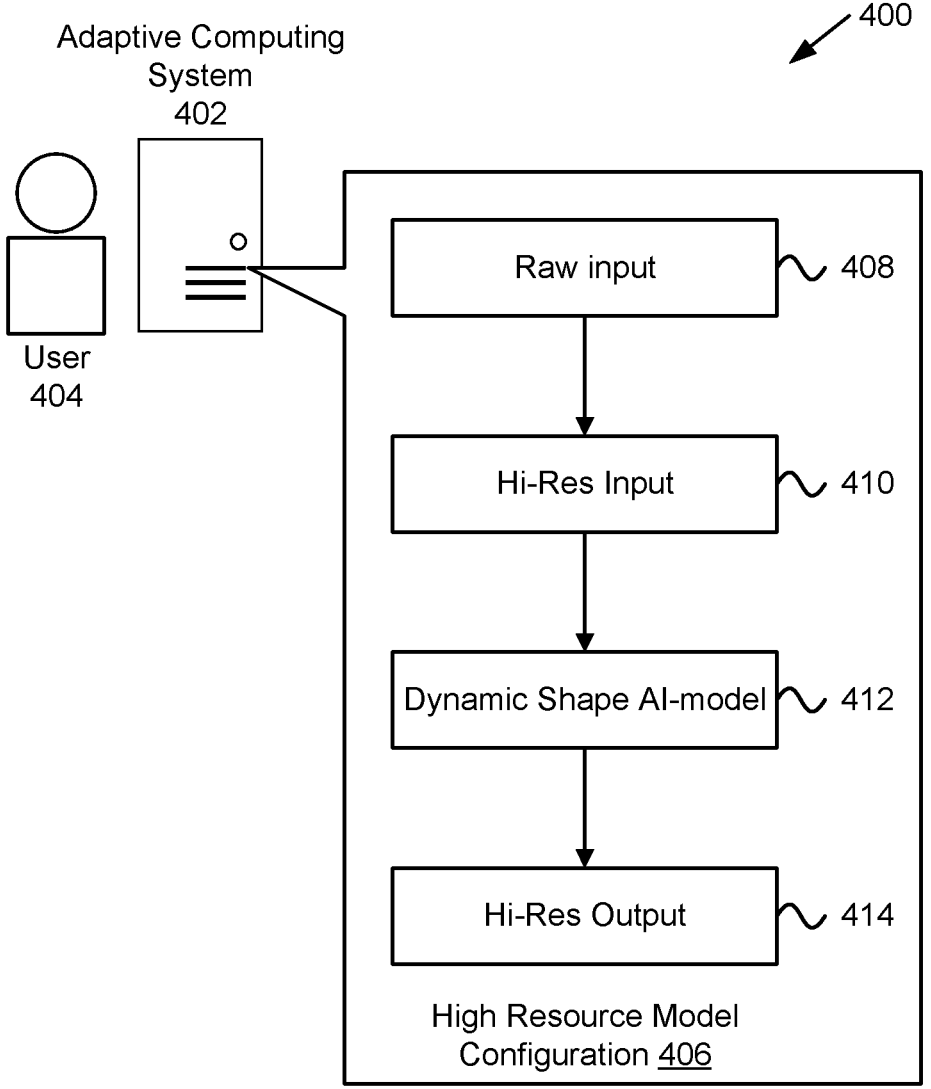
FIG. 4 is a diagram illustrating one embodiment of a representative runtime solution for adaptive configuration of an AI model in accordance with various embodiments.

FIG. 4 depicts an exemplary scenario 400 of an adaptive computing system 402 implementing a first runtime configuration of a computing model 110, according to embodiments of the disclosure. The adaptive computing system 402 may be one embodiment of the computing device 101 and may include an embodiment of the adaptive runtime apparatus 112, the apparatus 200, and/or the apparatus 300.

During runtime, the adaptive computing system 402 runs a computing model (e.g., an embodiment of the computing model 110) that processes image data and presents model output to the user 404. In the scenario 400, it is assumed that the amount of available computing resources is relatively high (e.g., greater than (or equal to) a predetermined threshold). Accordingly, the adaptive computing system 402 configures the computing model to use the first runtime configuration, referred to as the high resource model configuration 406.

When implementing the high resource model configuration 406, the adaptive computing system 402 receives raw input 408. Optionally, the adaptive computing system 402 may format and/or pre-process the raw input 408 to realize the high resolution ("hi-res") input 410. The high resolution input 410 is supplied to a dynamic shape AI-model 412 which performs AI-based image processing to generate the high resolution digital image output 414 which is presented to at least the user 404, e.g., using an output device.

In some embodiments, the output device includes an electronically controllable display or display device capable of outputting visual data to the user 404. For example, the output device may include, but is not limited to, a Liquid Crystal Display ("LCD"), a Light-Emitting Diode ("LED") display, an Organic LED ("OLED") display, a projector, or similar display device capable of outputting images, video, or the like to the user 404. As another, non-limiting, example, the output device may include a wearable display separate from, but communicatively coupled to, the adaptive computing system 402, such as a smart watch, smart glasses, a heads-up display, or the like.

Figure 5:
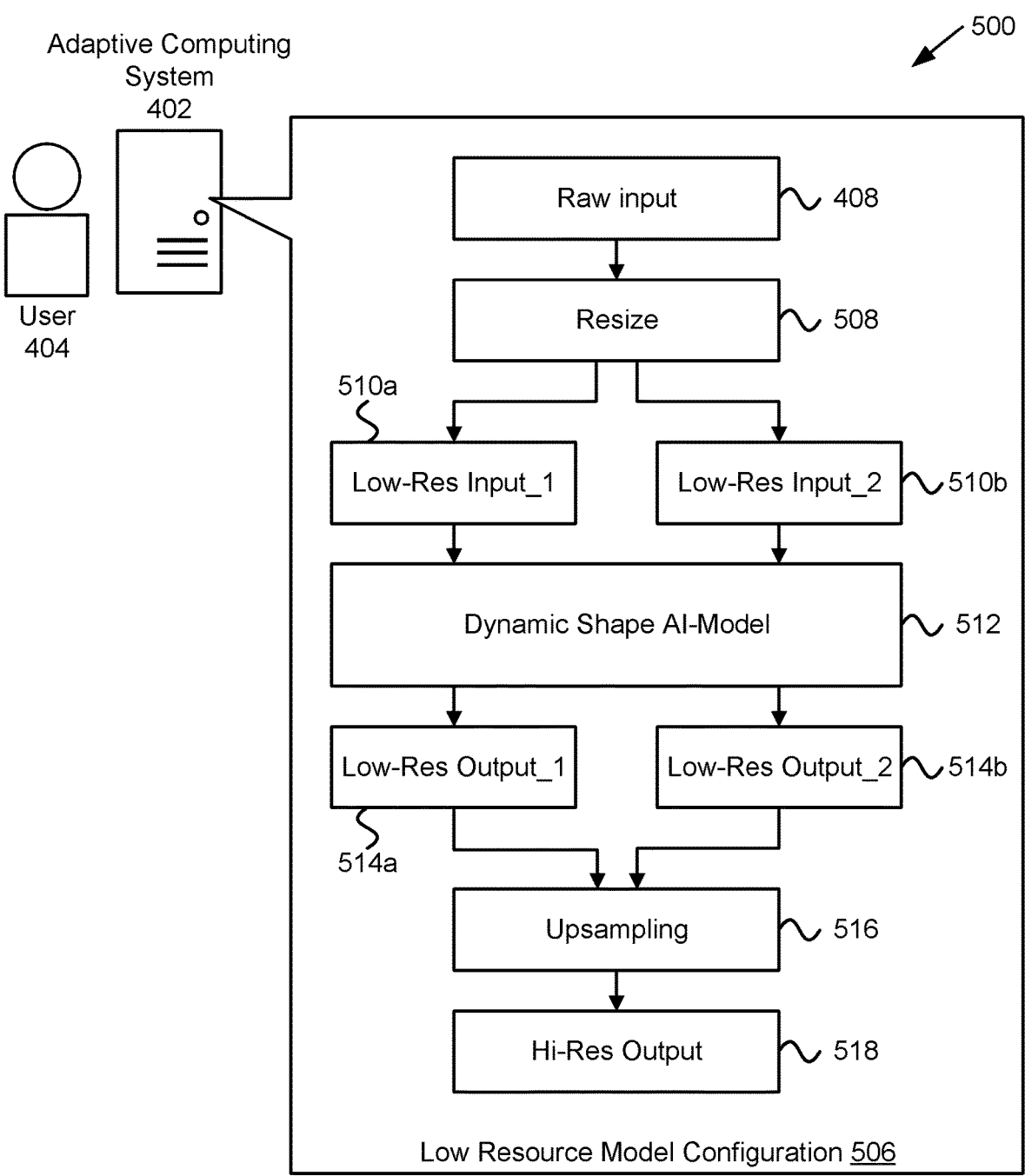
FIG. 5 is a diagram illustrating another embodiment of a representative runtime solution for adaptive configuration of an AI model in accordance with various embodiments.

FIG. 5 depicts an exemplary scenario 500 of the adaptive computing system 402 implementing a second runtime configuration of a computing model 110, according to embodiments of the disclosure. In the scenario 500, it is assumed that runtime adaptation is triggered at the adaptive computing system 402, e.g., due to predicted reduction of model performance, detected resource conflict, etc. In one embodiment, an amount of available computing resources (e.g., actual or scheduled) is less than (or equal to) a predetermined threshold. Accordingly, the adaptive computing system 402 selects the second runtime configuration and configures the computing model to use the second runtime configuration, referred to as the low resource model configuration 506.

When implementing the low resource model configuration 506, the adaptive computing system 402 receives the raw input 408. Additionally, the adaptive computing system 402 performs a resize operation 508 on the raw input 408 to generate at least two streams of lower resolution input, depicted as the first low resolution input 510a (depicted as "Low-Res Input 1") and the second low resolution input 510b (depicted as "Low-Res Input 2"). In one embodiment, the resizing operation is part of a data formatting and/or pre-processing operation.

In some embodiments, the low resolution inputs 510a and 510b are supplied to a dynamic shape AI-model 512 which performs AI-based image processing to generate multiple streams of lower resolution output, depicted as the first low resolution output 514a (depicted as "Low-Res Output 1") and the second low resolution output 514b (depicted as "Low-Res Output 2"). In certain embodiments, the dynamic shape AI-model 512 is the same AI-model as the dynamic shape AI-model 412. In other embodiments, the dynamic shape AI-model 512 is a different AI-model adapted to generate lower resolution outputs from lower resolution inputs.

In some embodiments, the low resolution outputs 514a and 514b are combined and transformed by upsampling 516 to generate the high resolution digital image output 518, which high resolution digital image output 518 presented to at least the user 404, e.g., using an output device.

In some embodiments, the high resolution digital image output 518 is inferior (e.g., lower quality) to the high resolution digital image output 414. For example, the pixel resolution, spatial resolution, contrast resolution, dynamic range, frame rate, image format, or other image characteristic may be inferior (e.g., lower quality) in the high resolution digital image output 518 than in the high resolution digital image output 414. Accordingly, when sufficient computing resources become available, the adaptive computing system 402 may re-configure the computing model to use the high resource model configuration 406.

FIG. 6 depicts an exemplary method 600 for collating and selectively presenting communications, according to embodiments of the disclosure. In various embodiments, the method 600 is performed by a computing device, such as the computing device 101, the apparatus 200, the apparatus 300, and/or the adaptive computing system 402, as described above. In some embodiments, the method 600 is performed by a processor, such as a microcontroller, a microprocessor, a CPU, a GPU, an auxiliary processing unit, a FPGA, or the like.

The method 600 begins and runs 602 a computing model (e.g., computing model 110) on the computing device using a first runtime configuration among a plurality of runtime configurations that are configured for the computing model. In some embodiments, the computing model comprises a MIL, model, AI model, a Deep Learning model, a computational model, a simulator model, a neural network model, cognitive model, or a combination thereof.

The method 600 includes determining 604, by the computing device, a reduction in model performance. In some embodiments, determining the reduction in model performance comprises determining the reduction in model performance based at least in part on a monitored set of performance metrics. In some embodiments, determining the reduction in model performance comprises determining the reduction in model performance based at least in part on the predicted increase in computing resource usage, e.g., based on audio input, UI interactions, and/or a notification of resource scheduling.

The method 600 includes selecting 606 a second runtime configuration based at least in part on the determined reduction in model performance. In some embodiments, the first runtime configuration uses more computing resources than a second runtime configuration. Similarly, the first runtime configuration may produce a higher quality output than the second runtime configuration.

The method 600 includes running 608 the computing model using the second runtime configuration in response to the determined reduction in model performance. In some embodiments, running the computing model using the second runtime configuration comprises re-configuring the computing model in real-time. The method 600 ends.

Figure 7:
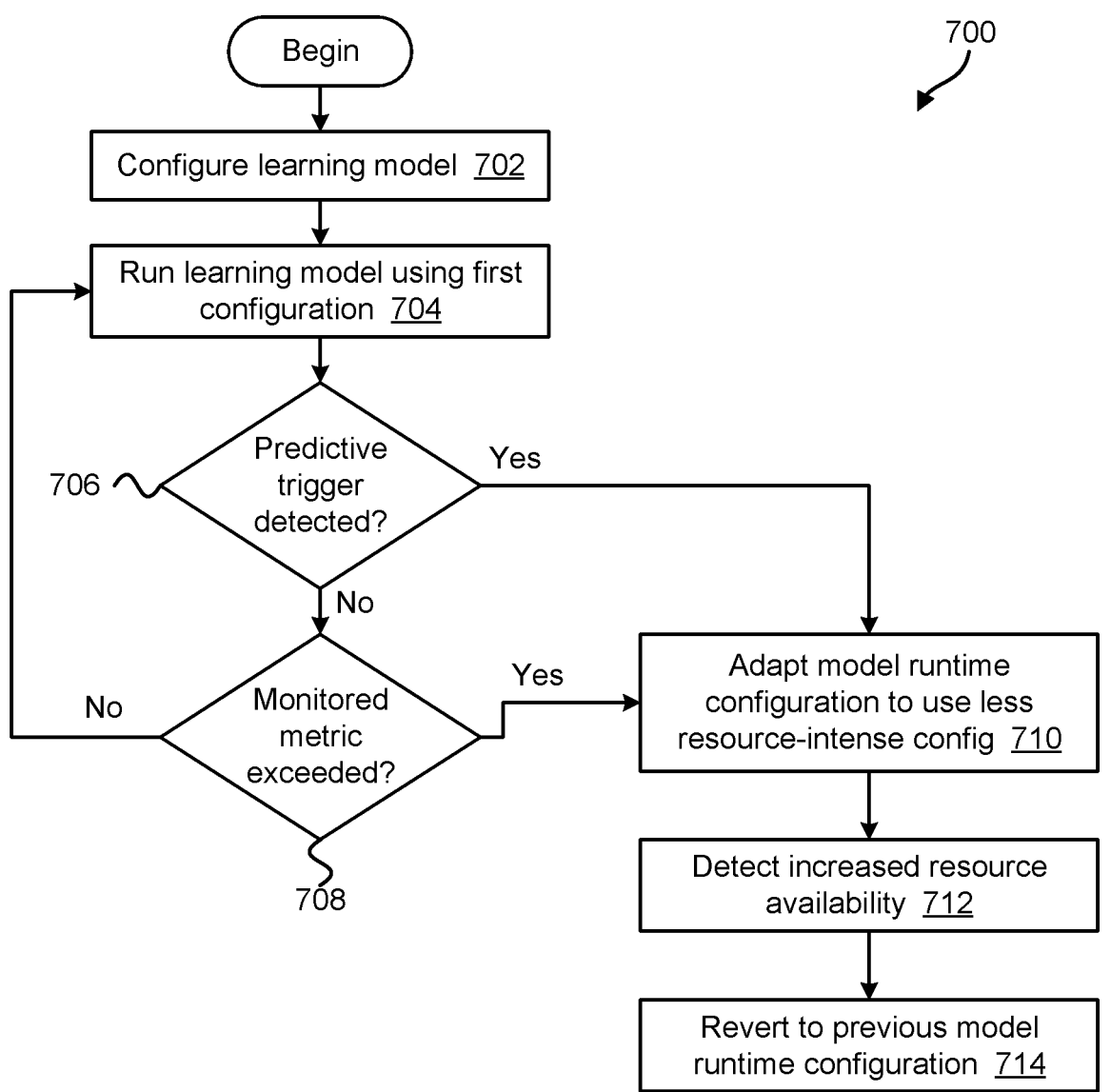
FIG. 7 is a flow chart diagram illustrating another embodiment of a representative method for selecting a runtime configuration based on model performance.

FIG. 7 depicts an exemplary method 700 for collating and selectively presenting communications, according to embodiments of the disclosure. In various embodiments, the method 700 is performed by a computing device, such as the computing device 101, the apparatus 200, the apparatus 300, and/or the adaptive computing system 402, as described above. In some embodiments, the method 700 is performed by a processor, such as a microcontroller, a microprocessor, a CPU, a GPU, an auxiliary processing unit, a FPGA, or the like.

The method 700 begins and configures 702 a learning model (e.g., an implementation of the computing model 110). Here, the learning model is configured with a multiple runtime configurations.

The method 700 includes running 704 the learning model on the computing device using a first runtime configuration among the multiple runtime configurations that are configured for the learning model. In some embodiments, the learning model comprises a ML model, AI model, a Deep Learning model, a computational model, a simulator model, a neural network model, cognitive model, or a combination thereof.

The method 700 includes determining 706 whether a predictive trigger is detected. Here, the predictive trigger is indicative of a reduction in model performance. In certain embodiments, the predictive trigger comprises an audio cue indicative of a reduction in model performance. In certain embodiments, the predictive trigger comprises a UI interaction indicative of a reduction in model performance. In other embodiments, the predictive trigger is a notification of scheduled consumption of computing resources.

The method 700 includes determining 708 whether a monitored performance metric is satisfied. In certain embodiments, satisfaction of the monitored performance metric is correlated with reduced model performance. In certain embodiments, satisfaction of the monitored a performance metric is correlated with unavailability of computing resources (i.e., indicating a resource conflict). In some embodiments, the monitored set of performance metrics includes one or more of: a processor usage, a chipset temperature, a chipset frequency, a power usage, an inter-frame arrival time, a frame processing time, a frame processing rate, an available amount of computing resources, or a combination thereof.

The method 700 includes adapting 710 a model runtime configuration to use a less resource-intensive runtime configuration. In some embodiments, the second runtime configuration uses fewer computing resources than the first runtime configuration. In certain embodiments, the learning model outputs image data, wherein the output image data has a higher resolution when using the first runtime configuration and has a lower resolution when using the less resource-intensive runtime configuration.

The method 700 includes detecting 712 an increased resource availability. In some embodiments, detecting 712 the increased resource availability comprises the monitored performance metric re-attaining a previous (e.g., initial) value or range. In some embodiments, detecting 712 the increased resource availability comprises detecting a predictive trigger indicative of the increased resource availability.

The method 700 includes reverting 714 to a previous model runtime configuration (e.g., the first runtime configuration) in response to the detected increase in resource availability. The method 700 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
running a computing model on a computing device using a first runtime configuration among a plurality of runtime configurations that are configured for the computing model, wherein the computing device comprises a plurality of computing resources;
detecting, by the computing device, a resource conflict in the plurality of resources in response to a predictive trigger;
determining, by the computing device, a reduction in model performance based on the detected resource conflict;
identifying, among the plurality of runtime configurations, a second runtime configuration based at least in part on the determined reduction in model performance; and
running the computing model using the second runtime configuration in response to the determined reduction in model performance, wherein the second runtime configuration improves model performance by reducing the resource conflict.

2. The method of claim 1, further comprising monitoring a set of performance metrics associated with the computing device, wherein determining the reduction in model performance comprises determining the reduction in model performance based at least in part on the monitored set of performance metrics.

3. The method of claim 2, wherein the monitored set of performance metrics includes one or more of:
a processor usage, a chipset temperature, a chipset frequency, a power usage, an inter-frame arrival time, a frame processing time, a frame processing rate, an available amount of computing resources, or a combination thereof.

4. The method of claim 1, further comprising:
capturing audio input; and
predicting an increase in computing resource usage based at least in part on the captured audio input,
wherein determining the reduction in model performance comprises determining the reduction in model performance based at least in part on the predicted increase in computing resource usage.

5. The method of claim 1, further comprising:
monitoring for a predetermined set of user interface ("UI") interactions; and
predicting an increase in computing resource usage based at least in part on detecting a UI interaction from the predetermined set of UI interactions,
wherein determining the reduction in model performance comprises determining the reduction in model performance based at least in part on the predicted increase in computing resource usage.

6. The method of claim 1, wherein running the computing model using the second runtime configuration comprises re-configuring the computing model in real-time.

7. The method of claim 1, wherein the computing model comprises one of: a machine-learning model, an Artificial Intelligence model, a Deep Learning model, or a combination thereof.

8. The method of claim 7, wherein the computing model outputs image data, wherein the output image data has a first resolution when using the first runtime configuration and has a second resolution, lower than the first resolution, when using the second runtime configuration.

9. The method of claim 1, further comprising:
receiving, via an application programming interface, a notification of scheduled consumption of computing resources,
wherein determining the reduction in model performance comprises determining the reduction in model performance based at least in part on the notification of scheduled consumption of computing resources.

10. The method of claim 1, wherein the second runtime configuration uses fewer computing resources than the first runtime configuration, the method further comprising:
determining an end to the reduction in model performance; and
running the computing model using the first runtime configuration in response to the end to the reduction in model performance.

11. An apparatus comprising:
a processor; and
a memory coupled to the processor, the memory comprising instructions executable by the processor to cause the apparatus to:
run a computing model of a computing device using a first runtime configuration among a plurality of runtime configurations that are configured for the computing model, wherein the computing device comprises a plurality of computing resources;
detect a resource conflict in the plurality of resources in response to a predictive trigger;
determine a reduction in model performance based on the detected resource conflict;
identify, among the plurality of runtime configurations, a second runtime configuration based at least in part on the determined reduction in model performance; and
run the computing model using the second runtime configuration in response to the determined reduction in model performance, wherein the second runtime configuration improves model performance by reducing the resource conflict.

12. The apparatus of claim 11, wherein the instructions are further executable by the processor to cause the apparatus to:

monitor a set of performance metrics associated with the apparatus, wherein to determine the reduction in model performance, the instructions are further executable by the processor to cause the apparatus to determine the reduction in model performance based at least in part on the monitored set of performance metrics, wherein the monitored set of performance metrics includes one or more of: a processor usage, a chipset temperature, a chipset frequency, a power usage, an inter-frame arrival time, a frame processing time, a frame processing rate, an available amount of computing resources, or a combination thereof.

13. The apparatus of claim 11, wherein the instructions are further executable by the processor to cause the apparatus to:

capture audio input; and predict an increase in computing resource usage based at least in part on the captured audio input, wherein to determine the reduction in model performance, the instructions are executable by the processor to cause the apparatus to determine the reduction in model performance based at least in part on the predicted increase in computing resource usage.

14. The apparatus of claim 11, wherein the instructions are further executable by the processor to cause the apparatus to:

monitor for a predetermined set of user interface ("UI") interactions; and predict an increase in computing resource usage based at least in part on detecting a UI interaction from the predetermined set of UI interactions, wherein to determine the reduction in model performance, the instructions are executable by the processor to cause the apparatus to determine the reduction in model performance based at least in part on the predicted increase in computing resource usage.

15. The apparatus of claim 11, wherein to run the computing model using the second runtime configuration, the instructions are executable by the processor to cause the apparatus to re-configure the computing model in real-time.

16. The apparatus of claim 11, wherein the computing model comprises one of: a machine-learning model, an Artificial Intelligence model, a Deep Learning model, or a combination thereof.

17. The apparatus of claim 16, wherein the computing model outputs image data, wherein the output image data has a first resolution when using the first runtime configuration and has a second resolution, lower than the first resolution, when using the second runtime configuration.

18. The apparatus of claim 11, wherein the instructions are further executable by the processor to cause the apparatus to:

receive, via an application programming interface, a notification of scheduled consumption of computing resources, wherein to determine the reduction in model performance, the instructions are executable by the processor to cause the apparatus to determine the reduction in model performance based at least in part on the notification of scheduled consumption of computing resources.

19. The apparatus of claim 11, wherein the second runtime configuration uses fewer computing resources than the first runtime configuration, wherein the instructions are further executable by the processor to cause the apparatus to:

determine an end to the reduction in model performance; and run the computing model using the first runtime configuration in response to the end to the reduction in model performance.

20. A computer program product comprising a non-transitory computer readable storage medium storing code, the code being configured to be executable by a processor to perform operations comprising:

running a computing model of a computing device using a first runtime configuration among a plurality of runtime configurations that are configured for the computing model, wherein the computing device comprises a plurality of computing resources;

detecting a resource conflict in the plurality of resources in response to a predictive trigger;

determining a reduction in model performance based on the detected resource conflict;

identifying, among the plurality of runtime configurations, selecting a second runtime configuration based at least in part on the determined reduction in model performance; and running the computing model using the second runtime configuration in response to the determined reduction in model performance, wherein the second runtime configuration improves model performance by reducing the resource conflict.

* * * * *